(12) United States Patent
Yoon et al.

(10) Patent No.: US 12,176,496 B2
(45) Date of Patent: Dec. 24, 2024

(54) BATTERY MODULE AND BATTERY PACK INCLUDING THE SAME

(71) Applicant: LG Energy Solution, Ltd., Seoul (KR)

(72) Inventors: Han Ki Yoon, Daejeon (KR); Junyeob Seong, Daejeon (KR); Youngho Lee, Daejeon (KR); Junkyu Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 517 days.

(21) Appl. No.: 17/252,112

(22) PCT Filed: Apr. 10, 2020

(86) PCT No.: PCT/KR2020/004904
§ 371 (c)(1),
(2) Date: Dec. 14, 2020

(87) PCT Pub. No.: WO2020/256264
PCT Pub. Date: Dec. 24, 2020

(65) Prior Publication Data
US 2021/0273267 A1     Sep. 2, 2021

(30) Foreign Application Priority Data
Jun. 18, 2019 (KR) .................. 10-2019-0072498

(51) Int. Cl.
*H01M 10/00* (2006.01)
*H01M 10/42* (2006.01)
(Continued)

(52) U.S. Cl.
CPC ....... *H01M 10/425* (2013.01); *H01M 10/482* (2013.01); *H01M 50/204* (2021.01);
(Continued)

(58) Field of Classification Search
CPC ............ H01M 10/425; H01M 10/482; H01M 50/209; H01M 50/502; H01M 50/204;
(Continued)

(56) References Cited

U.S. PATENT DOCUMENTS

| 8,846,239 B2 | 9/2014 | Park et al. |
| 2009/0214936 A1 | 8/2009 | Yang et al. |

(Continued)

FOREIGN PATENT DOCUMENTS

| JP | 2009529136 A | 8/2009 |
| JP | 5896813 B2 | 3/2016 |

(Continued)

OTHER PUBLICATIONS

Extended European Search Report including Written Opinion for Application No. 20800539.7 dated May 27, 2021, 7 pages.

(Continued)

*Primary Examiner* — Nicholas P D'Aniello
(74) *Attorney, Agent, or Firm* — Lerner David LLP

(57) ABSTRACT

The present disclosure relates to a battery module and a battery pack including the same, and more particularly, to a battery module including an improved sensing connection member. The battery module includes a battery cell stack in which a plurality of battery cells are stacked, a lower frame covering a bottom surface and both side surfaces of the battery cell stack, an upper frame covering an upper surface of the battery cell stack, a busbar frame formed on each of front and rear surfaces of the battery cell stack, and a connection unit that connects the bus-bar frame, wherein the connection unit is formed of a flexible flat cable (FFC) and is located between the upper frame and the battery cell stack.

12 Claims, 6 Drawing Sheets

(51) Int. Cl.
  *H01M 10/48*   (2006.01)
  *H01M 50/204*  (2021.01)
  *H01M 50/209*  (2021.01)
  *H01M 50/502*  (2021.01)
  *H01M 50/503*  (2021.01)

(52) U.S. Cl.
  CPC ....... *H01M 50/209* (2021.01); *H01M 50/502* (2021.01); *H01M 50/503* (2021.01)

(58) Field of Classification Search
  CPC ............. H01M 50/503; H01M 50/507; H01M 2004/028; H01M 10/48; Y02E 60/10
  See application file for complete search history.

(56) References Cited

U.S. PATENT DOCUMENTS

| | | | |
|---|---|---|---|
| 2012/0328920 A1* | 12/2012 | Takase | H01M 50/503 429/158 |
| 2015/0093615 A1 | 4/2015 | Yoshioka | |
| 2015/0162648 A1 | 6/2015 | Yang et al. | |
| 2016/0248070 A1* | 8/2016 | Ahn | H01M 50/209 |
| 2016/0380319 A1* | 12/2016 | Rhein | H01M 50/569 429/90 |
| 2019/0001838 A1 | 1/2019 | Choi et al. | |
| 2019/0020012 A1 | 1/2019 | Ju et al. | |
| 2019/0131596 A1 | 5/2019 | Yang et al. | |
| 2019/0324087 A1 | 10/2019 | Kim | |
| 2019/0348720 A1 | 11/2019 | Oh et al. | |
| 2019/0389318 A1 | 12/2019 | Lee et al. | |
| 2020/0014005 A1* | 1/2020 | Lee | F16M 11/22 |

FOREIGN PATENT DOCUMENTS

| | | | | |
|---|---|---|---|---|
| JP | 2018538669 | A | 12/2018 | |
| JP | 2019511810 | A | 4/2019 | |
| JP | 2020522855 | A | 7/2020 | |
| KR | 20120048259 | A | 5/2012 | |
| KR | 20130116446 | A | 10/2013 | |
| KR | 20140072689 | A | 6/2014 | |
| KR | 20140081960 | A | 7/2014 | |
| KR | 20170094981 | A | 8/2017 | |
| KR | 101829350 | B1 | 2/2018 | |
| KR | 20180022445 | A | 3/2018 | |
| KR | 20180038253 | A | 4/2018 | |
| KR | 20180099437 | A | 9/2018 | |
| KR | 101944111 | B1 | 1/2019 | |
| KR | 20190061378 | A | 6/2019 | |
| WO | WO-2018038513 | A1 * | 3/2018 | ............. G01R 31/36 |
| WO | WO-2018066797 | A1 * | 4/2018 | .......... B60L 11/1877 |
| WO | WO-2018159928 | A1 * | 9/2018 | ............. F16M 11/22 |
| WO | 2019088625 | A1 | 5/2019 | |

OTHER PUBLICATIONS

International Search Report for Application No. PCT/KR2020/004904 mailed Jul. 29, 2020, 3 pages.

* cited by examiner

【FIG. 1】
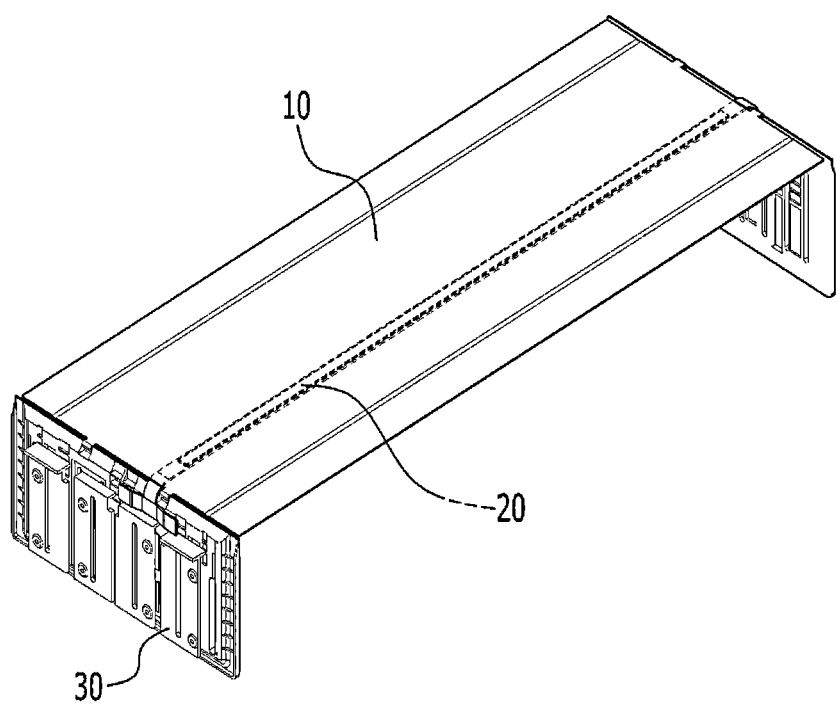
PRIOR ART

【FIG. 2】
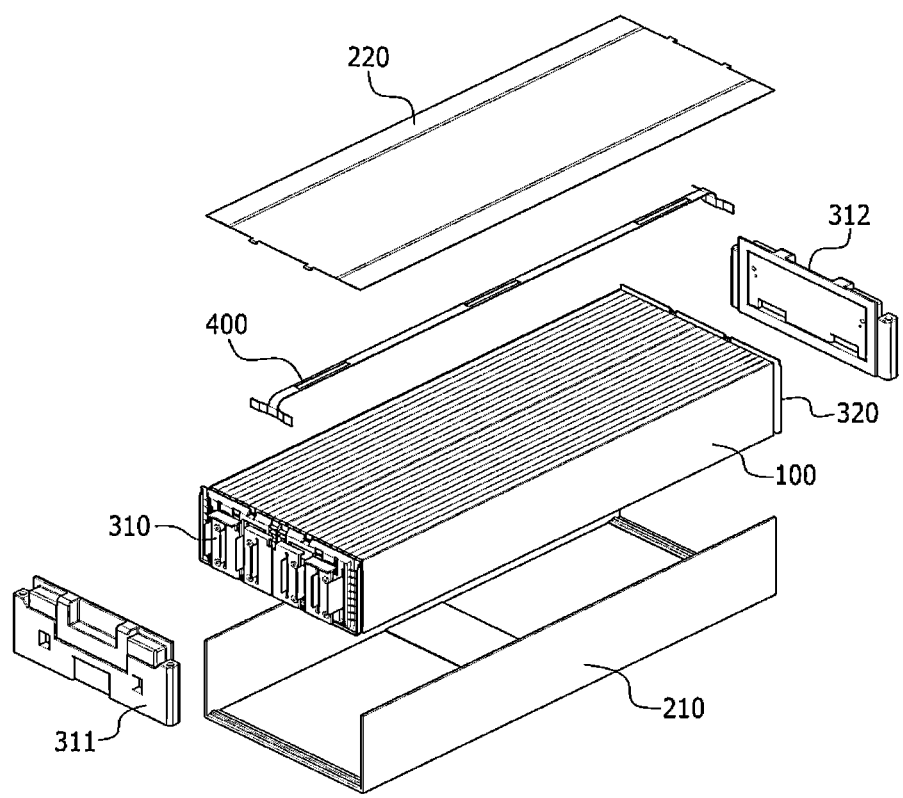

[FIG. 3]
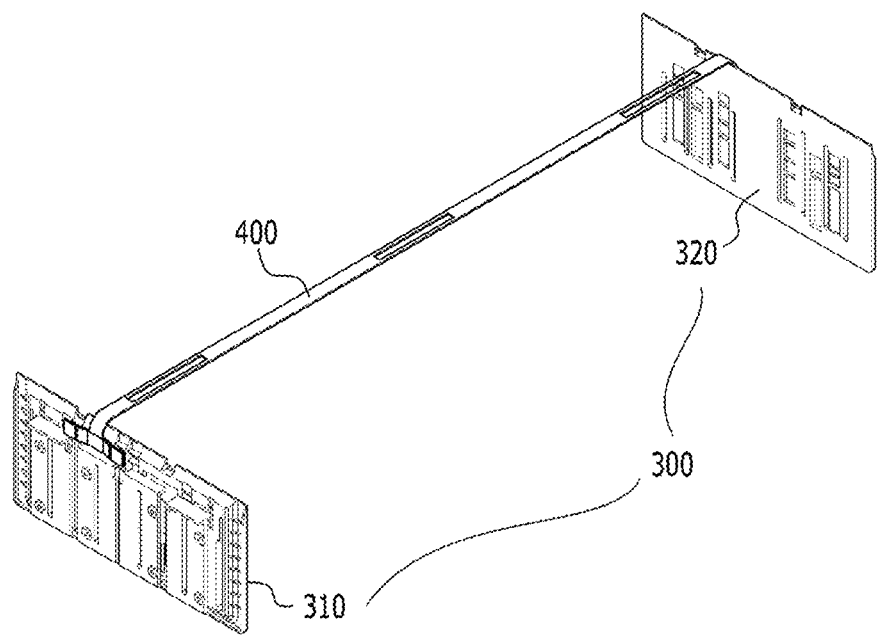
[FIG. 4]
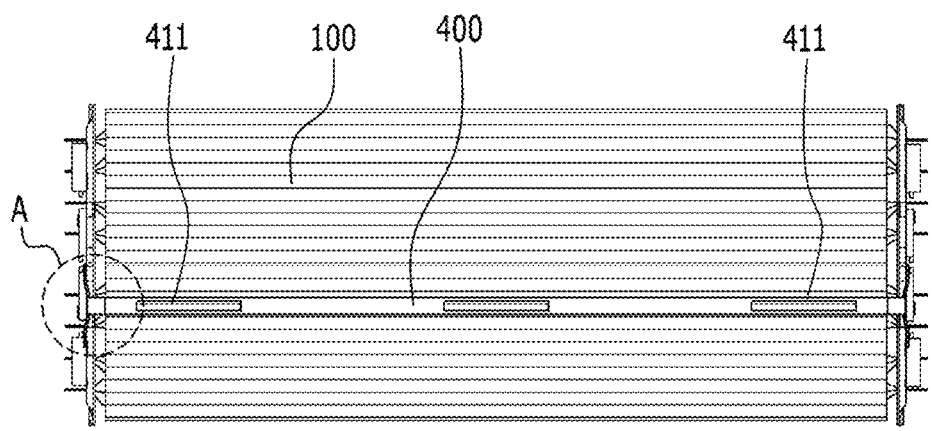

[FIG. 5]
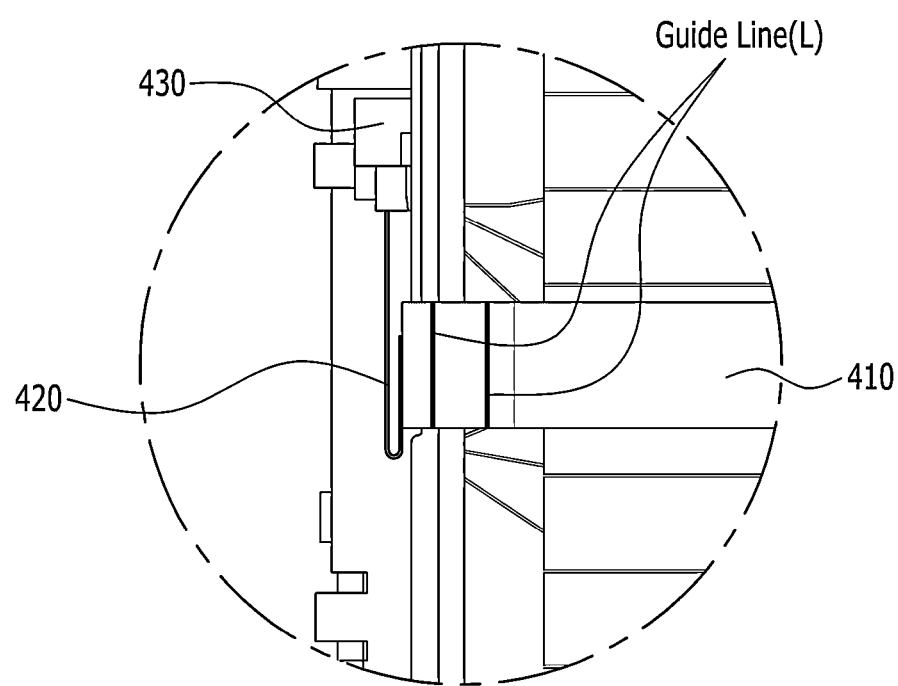

[FIG. 6]
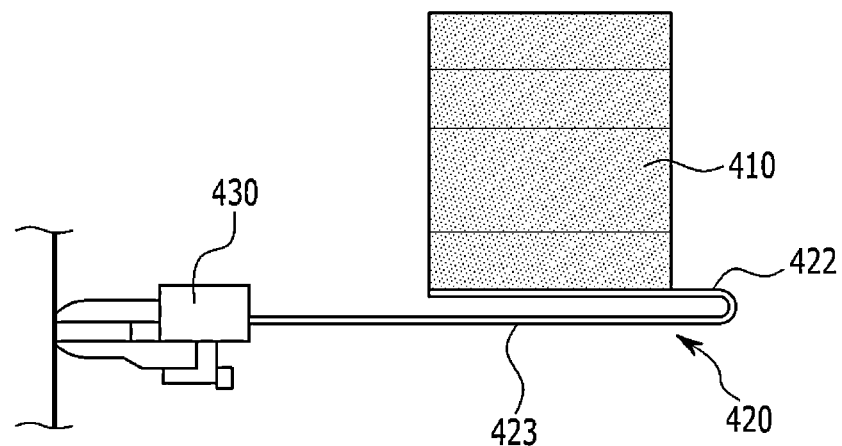
[FIG. 7]
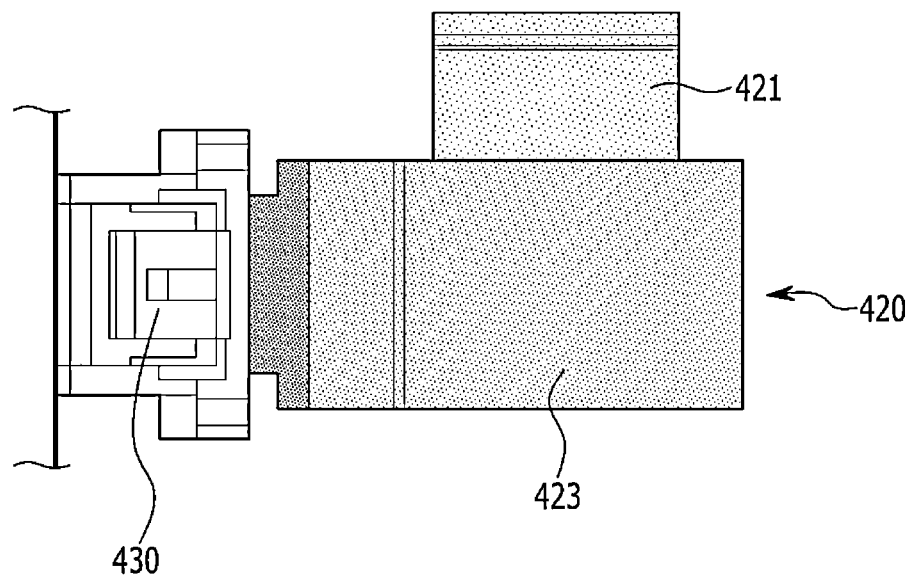

[FIG. 8]
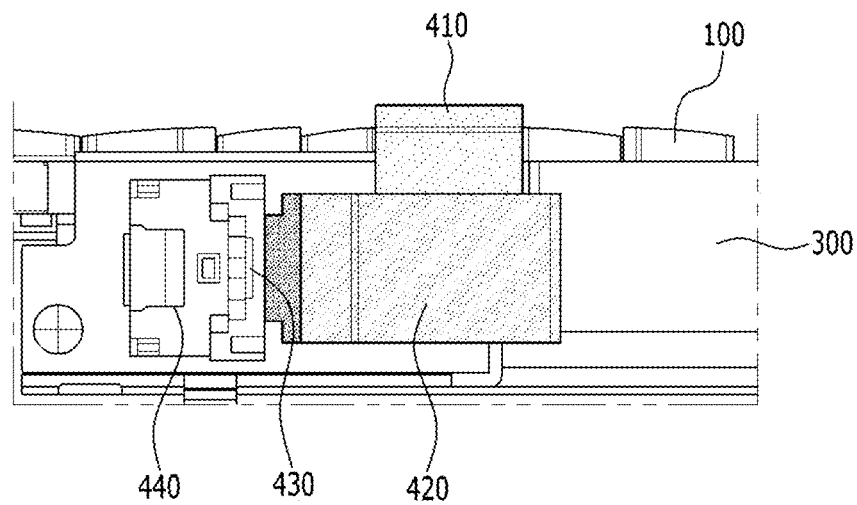
[FIG. 9]
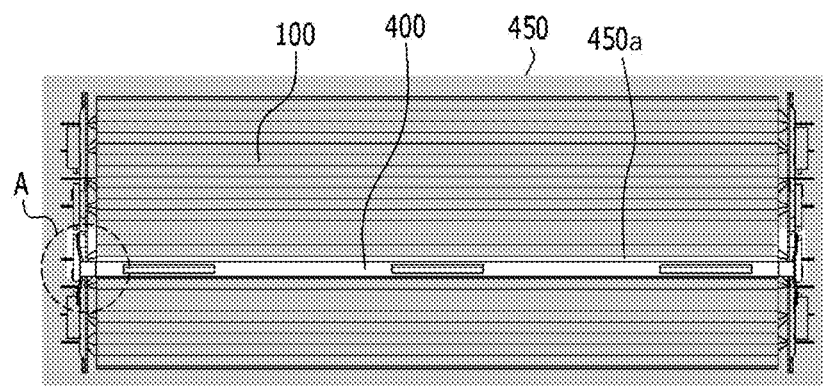

BATTERY MODULE AND BATTERY PACK INCLUDING THE SAME

CROSS-REFERENCE TO RELATED APPLICATIONS

This application is a national phase entry under 35 U.S.C. § 371 of PCT/KR2020/004904, filed on Apr. 10, 2020, which claims the benefit of Korean Patent Application No. 10-2019-0072498, filed on Jun. 18, 2019, with the Korean Intellectual Property Office, the disclosure of which are each incorporated herein by reference in their entirety.

TECHNICAL FIELD

The present disclosure relates to a battery module and a battery pack including the same, and more particularly, to a battery module including an improved sensing connection member.

BACKGROUND ART

A secondary battery has attracted much attention as an energy source in various products such as mobile devices and an electric vehicles. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell, and to configure a battery pack by using at least one of the battery modules and adding other components.

Such a battery module includes a battery cell stack in which a plurality of battery cells are stacked, a busbar frame formed at each of both ends of the battery cell stack, and a connection unit connecting the busbar frames at both ends.

FIG. 1 is a view showing a busbar frame, a cover plate connecting a busbar frame at both ends, and a flexible printed circuit board (FPC) provided on the cover plate in a conventional battery module.

Referring to FIG. 1, conventionally, busbar frames 30 at both ends are connected via a flexible printed circuit board 20, and a cover plate 10 is installed on the upper end of the flexible printed circuit board 20, thereby preventing damage to the flexible printed circuit board 20.

However, as disclosed in FIG. 1, due to the cover plate 10 provided with the flexible printed circuit board 20, there is a problem that the height of the battery module is also increased by its thickness, and the weight of the module is increased.

When the size of the battery module is increased in this way, there are problems that more installation space is required when installing the battery module, and the travelling performance of a vehicle is deteriorated when the battery module is installed in the vehicle.

In addition, when the weight of the battery module increases, the utility of the battery module decreases as a whole. Similarly, when a battery module having a heavy weight is installed in a vehicle, there is a problem in that the travelling performance of the vehicle decreases and fuel efficiency decreases.

DETAILED DESCRIPTION OF THE INVENTION

Technical Problem

It is an object of the present disclosure to provide a battery module including a sensing connection member having a more compact and simple structure, and a battery pack including the same.

Technical problems to be solved by the present disclosure are not limited to the above-mentioned technical problems, and other technical problems, which are not mentioned above, may be clearly understood from the following descriptions by those skilled in the art to which the present disclosure pertains.

Technical Solution

In order to achieve that above object, one embodiment of the present disclosure provides a battery module and a battery pack including the same, the battery module comprising: a battery cell stack in which a plurality of battery cells are stacked; a lower frame covering a bottom surface and both side surfaces of the battery cell stack; an upper frame covering an upper surface of the battery cell stack; a busbar frame formed on each of front and rear surfaces of the battery cell stack; and a connection unit that connects the busbar frame, wherein the connection unit is formed of a flexible flat cable (FFC) and is located between the upper frame and the battery cell stack.

The connection unit may include a connection body that is located on the upper side surface of the battery cell stack, a connecting cable formed at both end of the connection body, each of the connecting cables being bent in a direction of a respective one of the busbar frames, and a connecting unit connector connected to a respective one of the connecting cables and coupled to the busbar frame.

Each one of the connection unit connectors may be coupled to a connection unit formed in the busbar frame.

Each one of the connecting cables may include a first connecting cable that is formed in a downward direction, a second connecting cable that is bent from the first connecting cable and formed in one direction along a stacking direction of the battery cell stack, and a third connecting cable that is bent from the second connecting cable and formed in another direction along the stacking direction of the battery cell stack.

The connecting cables may be formed in a flexible, flat shape.

The connection unit formed on the busbar frame may be formed on one side of the first connecting cable and coupled to a connection unit connector connected to the third connecting cable.

The connection unit may formed on an opposite side of the second connecting cable relative to the first connecting cable, the third connecting cable is formed longer than the second connecting cable, so that a connection unit connector connected to the third connecting cable can be coupled to the connection unit.

A total length of the second connecting cable and the third connecting cable may be longer than a distance between the first connecting cable and the connection unit.

Guide lines in two rows are formed on both sides of the connection unit, and the busbar frame may be located between two guide lines.

The connection unit may be formed so as to be parallel to a longitudinal direction of any one of the plurality of battery cells.

The connection unit may be formed so as to be parallel to the longitudinal direction of the battery cell stack at a position corresponding to a 16th battery cell of the battery cell stack based on an outermost battery cell on one side of the plurality of battery cells.

The connection unit may be coupled to the busbar frame through an opening formed in a guide jig.

A connection unit fixing part is formed in the connection unit, and the connection unit may be attached to the battery cell stack through the connection unit-fixing part.

The connection unit-fixing part may be located at lower parts on both sides of the connection unit so that the connection unit is attached to the battery cell stack.

Advantageous Effects

A battery module and a battery pack including the same according to an embodiment of the present disclosure provide an effect of increasing the energy density of the battery module itself, securing an installation space of the battery module, and improving travelling performance when installing the battery module or battery pack in a vehicle, because the height of the battery module is reduced due to the removal of the cover plate.

A battery module and a battery pack including the same according to another embodiment of the present disclosure provide an effect of enhancing the utility of the battery module and improving fuel efficiency when installing the battery module in the vehicle, because the weight of the battery module is reduced due to the removal of the cover plate.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a view showing a busbar frame, a cover plate connecting a busbar frame at both ends, and a flexible printed circuit board (FPC) provided on the cover plate in a conventional battery module.

FIG. 2 is a view showing a connection unit and a peripheral configuration according to an embodiment of the present disclosure.

FIG. 3 is a view showing a state in which the connection unit of FIG. 2 and the busbar frame are coupled.

FIG. 4 is a view of the connection unit according to an embodiment of the present disclosure, as viewed from the upper side.

FIG. 5 is an enlarged view of part A of FIG. 4.

FIG. 6 is a view of the connecting cable according to an embodiment of the present disclosure, as viewed from the upper side.

FIG. 7 is a view of the connecting cable according to an embodiment of the present disclosure, as viewed from the side surface.

FIG. 8 is a view showing a state in which a connecting cable according to an embodiment of the present disclosure is installed on a busbar frame.

FIG. 9 is a view showing a state of the guide jig according to an embodiment of the present disclosure.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

As used herein, terms such as first, second, and the like may be used to describe various components, and the terms are used only to discriminate one component from another component.

Further, the terms used herein are used only to describe exemplary embodiments, and are not intended to limit the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Hereinafter, a battery module according to one embodiment of the present disclosure will be described with reference to FIGS. 2 to 3.

FIG. 2 is a view showing a connection unit and a peripheral configuration according to an embodiment of the present disclosure. FIG. 3 is a view showing a state in which the connection unit of FIG. 2 and the busbar frame are coupled.

Referring to FIGS. 2 and 3, a battery module according to a first embodiment of the present disclosure comprises: a battery cell stack in which a plurality of battery cells 100 are stacked, a lower frame 210 that is formed in a U-shaped structure on a bottom surface and both side surfaces and covers the bottom surface and the both side surfaces of the battery cell stack, an upper frame 220 covering an upper surface of the battery cell stack, a busbar frame 300 formed on each of front and rear surfaces of the battery cell stack; and a connection unit 400 that connects the busbar frame.

The battery cell 100 is a secondary battery, and may be configured as a pouch type secondary battery. The battery cell 100 may be composed of a plurality of cells, and the plurality of battery cells 100 may be stacked with each other so as to be electrically connected to each other, thereby forming a battery cell stack. Each of the plurality of battery cells may include an electrode assembly, a battery case, and an electrode lead protruding from the electrode assembly.

The battery cell stack is formed by being surrounded by a lower frame 210 covering the lower surface and both side surfaces and an upper frame 220 covering the upper surface. At this time, the battery cell stack is inserted into the lower frame 210 and then, the battery cell stack may be mounted inside the frame by covering the upper side surface of the battery cell stack through the upper frame.

The lower frame 210 and the upper frame 220 are coupled to each other to accommodate a battery cell stack located inside the frame. At this time, the two frames can be joined through welding. However, the method of joining the frames is not limited thereto, and may be implemented through various embodiments.

A busbar frame 300 is formed on the front and rear surfaces of the battery cell stack, respectively. The busbar frame 300 includes a busbar and a cell connecting board, and it may be formed by covering both side surfaces of the battery cell stack so that the electrode leads of the plurality of battery cells 100 can be electrically connected.

The busbar frame 300 is formed of a first busbar frame 310 formed on one side surface of the battery cell stack, and a second busbar frame 320 formed on the other side surface of the battery cell stack, thus making it possible to electrically connect the electrode leads on both sides of the battery cell stack, respectively.

End plates 311 and 312 may be mounted to the first and second busbar frames 310 and 320, respectively. The end plates 311 and 312 can protect various electric components provided in the first and second busbar frames 310 and 320 from external impact, and at the same time, guide the electrical connection between the first and second busbar frames 310 and 320 and an external power source. An insulating member (not shown) is inserted between the end plates 311 and 312 and the first and second busbar frames 310 and 320, thereby making it possible to cut off unnecessary electrical connections between the busbar frames 310 and 320 and the outside.

The connection unit 400 is provided between the first and second busbar frames 310 and 320 to electrically connect the two busbar frames. Conventionally, a flexible printed circuit board (FPC) is provided between the busbar frames, two busbar frames are connected through the flexible printed circuit board, and a cover plate is mounted on the top of the flexible printed circuit board to prevent damage to the flexible printed circuit board. However, according to an embodiment of the present disclosure, the cover plate that has protected and supported the flexible printed circuit board is eliminated, and a cable formed of a flexible flat cable (FFC) formed by a flat cable, not requiring a protective member such as a cover plate is used instead of the flexible printed circuit to connect the two busbar frames.

By connecting the two busbar frames through the FFC, the height of the battery module is reduced, so that the energy density of the battery itself can be increased, the installation space of the battery module can be secured, and travelling performance and fuel efficiency can be improved when the battery module is installed in a vehicle.

As described above, the connection unit 400 formed of FFC according to an embodiment of the present invention is located between the upper frame 220 and the battery cell 100 stack. In more detail, an insulating member (not shown) is formed on an upper side surface of the battery cell 100 stack, and the connection unit 400 is located between the insulating member (not shown) and the upper frame 220.

The connection unit 400 may be formed so as to be parallel to the longitudinal direction of one of the plurality of battery cells 100. According to an embodiment of the present disclosure, the connection unit 400 may be formed so as to be parallel to a longitudinal direction of the battery cell at a position corresponding to the 16th battery cell, based on the outermost battery cell of one side of the plurality of battery cells 100. By allowing the position of the connection unit to correspond to one of the battery cells in this way, the connection unit can be more easily assembled.

The connection unit 400 is formed of a flexible cable, and thus may be bent. The circuit for electrical connection between busbar frames is inserted inside the cable, so it is easy to cope with external shocks.

Hereinafter, the connection unit according to an embodiment of the present disclosure will be described with reference to FIGS. 4 to 5.

FIG. 4 is a view of the connection unit according to an embodiment of the present disclosure, as viewed from the upper side. FIG. 5 is an enlarged view of part A of FIG. 4.

The connection unit 400 may be formed so as to be parallel to a length direction of the plurality of battery cells 100. Thereby, the length of the connection unit 400 can be minimized, the cost of manufacturing the connection unit can be reduced, and when connecting to the busbar frame 300, it can be easily connected in the vertical direction.

A connection unit fixing part 411 may be formed in the connection unit 400. The connection unit fixing part 411 is located at both lower ends of the connection unit 400 and is attached to the battery cell stack, so that the connection unit 400 can be fixed to the battery cell stack.

Guide lines L formed in two rows may be formed on both sides of the connection unit 400. In order to connect the connection unit 400 to the first and second busbar frames 310 and 320 provided at both ends of the battery cell 100 stack at a position within an error range, the first and second busbar frames 310 and 320 may be coupled so as to be located between two guide lines L formed on both sides of the connection unit 400, when the battery module is viewed from the upper side to the lower side. By coupling the connection unit 400 to the busbar frame 300 via a guide line L, it is possible to mount the connection unit 400 more accurately and stably.

According to an embodiment of the present disclosure, the connection unit 400 may include a connection body 410 located on the upper side surface of the battery cell 100 stack, a connecting cable 420 that is bent and formed in the direction of the first and second busbar frames 310 and 320 from both ends of the connection body 410, and a connection unit connector 430 that is connected to the connecting cable 420 and coupled to the busbar frame 300, respectively.

Hereinafter, with reference to FIGS. 6 to 9, the configuration of the first, second, and third connecting cables and the connecting cable connector and mounting of the connection unit via a guide jig according to an embodiment of the present disclosure is explained.

FIG. 6 is a view of the connecting cable according to an embodiment of the present disclosure, as viewed from the upper side. FIG. 7 is a view of the connecting cable according to an embodiment of the present disclosure, as viewed from the side surface. FIG. 8 is a view showing a state in which a connecting cable according to an embodiment of the present disclosure is installed on a busbar frame. FIG. 9 is a view showing a state of the guide jig according to an embodiment of the present disclosure.

Referring to FIGS. 6 to 9, the connecting cable 420 may include a first connecting cable 421 formed in a downward direction, a second connecting cable 422 that is bent and formed in one direction among the stacking directions of the battery cell 100 stack from the first connecting cable 421, and a third connecting cable 423 that is bent and formed in the other direction among the stacking directions of the battery cell 100 stack from the second connecting cable 422. The connecting cable 420 is formed in a flexible, flat shape, and may be bent and mounted around a flat surface.

The connection unit connector 430 is connected to a third connecting cable 423 and may be coupled to the connection unit 440 formed on one side of the busbar frame 300. In more detail, the connection unit 440 is formed on the opposite side of a second connecting cable 422 based on the first connecting cable 421, and the third connecting cable 423 is formed longer than the second connecting cable 422.

Therefore, the connecting cable 420 connected to the connection body 410 is first extended in the downward vertical direction through the first connecting cable 421 along the frame surface of the busbar frame 300, and reached the height at which the connection unit 440 is located, it is bent at 90 degrees through the second connecting cable 422 and horizontally extended in the opposite direction of the connection unit 440. After the second connecting cable 422 extends by a predetermined length, it may have a structure of being bent again in a 180 degree direction through the third connecting cable 423 to horizontally extend in a direction in which the connection unit 440 is located.

In addition, the total length of the second connecting cable 422 and the third connecting cable 423 may be longer than the distance between the first connecting cable 421 and the connection unit 440. In this way, since the connecting cable 420 forms a curved part, and the second connecting cable 422 and the third connecting cable 423 secure an extra length, it is possible to stably operate the electrical connection route between the busbars when the connection unit 400 is tensioned.

When the connection unit 400 is coupled to the busbar frame, it can be coupled using a guide jig 450. When the connection unit 400 is coupled, the guide jig 450 is located at a predetermined position in the upper side part of the battery cell stack, and an opening 450a formed in the guide jig 450 may be formed into a size corresponding to the coupling position and shape of the connection unit 400.

Therefore, when the connection unit 400 is coupled, the connection unit 400 may be inserted into the opening 450a of the guide jig 450 and coupled to the busbar frame 300. Using the guide jig 450, the coupling position of the connection unit 400 can be easily grasped, and precise and rapid coupling of the connection unit 400 may be performed.

The battery module described above may be included in the battery pack. The battery pack may have a structure in which one or more battery modules according to the present embodiment are collected, and then packed by adding a battery management system (BMS) and a cooling device to manage the temperature or voltage of the battery.

The battery pack can be applied to various devices. Such a device may be applied to a vehicle such as an electric bicycle, an electric vehicle, or a hybrid vehicle, but the present disclosure is not limited thereto, and is applicable to various devices that can use a battery module, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery cell
210: lower frame
220: upper frame
300: busbar frame
310: first busbar frame
320: second busbar frame
311, 312: end plate
400: connection unit
410: connecting body
411: connection unit-fixing part
420: connecting cable
421: first connecting cable
422: second connecting cable
423: third connecting cable
430: connection unit connector
440: connection unit
450: guide jig
450a: opening

The invention claimed is:

1. A battery module comprising:
a battery cell stack in which a plurality of battery cells are stacked along a stacking dimension;
a lower frame covering a bottom surface and both side surfaces of the battery cell stack;
an upper frame covering an upper surface of the battery cell stack;
a front busbar frame positioned along a front surfaces of the battery cell stack;
a rear busbar frame positioned along a rear surface of the battery cell stack; and
a connection unit that connects to the front and rear busbar frames, wherein the connection unit includes a body portion, a front connecting portion, a rear connecting portion, a front connector, and a rear connector, the body portion being located between the upper frame and the battery cell stack, the front and rear connecting portions extending from respective front and rear ends of the body portion to the respective front and rear connectors, and the front and rear connectors being connected to the respective front and rear busbar frames,
wherein the body portion is formed of a flexible flat cable (FFC), and
wherein the front and rear connecting portions each include a first segment, a second segment, and a third segment, each of the first segments extending downwardly from the respective front and rear end of the body portion to a first bend, each of the second segments extending from the respective first bend to a respective second bend along a first direction in the stacking dimension transverse to the first segment, and each of the third segments extending from the respective second bend to the respective front and rear connector along a second direction in the stacking dimension, the second direction being opposite to the first direction.

2. The battery module of claim 1,
wherein the front connecting portion and the rear connecting portion of the connection unit are formed in a flexible, flat shape.

3. The battery module of claim 1,
wherein each of the front and rear connectors are positioned on an opposite side of the first segment from the second segment, and wherein the third segment is longer than the second segment.

4. The battery module of claim 1,
wherein a total length of the second segment and the third segment of each of the front and rear connecting portions is longer than a distance between the first segment and the respective front or rear connector.

5. The battery module of claim 1,
further comprising guide lines formed in two rows on each of the front and rear ends of the body portion of the connection unit, and
wherein the front and rear busbar frames are positioned between the two rows of guide lines of the respective front and rear ends.

6. The battery module of claim 1,
wherein the connection unit is arranged so as to be parallel to a longitudinal direction of any one of the plurality of battery cells.

7. The battery module of claim 6,
wherein the connection unit is arranged so as to be parallel to the longitudinal direction of the battery cell stack at a position corresponding to a $16^{th}$ battery cell of the battery cell stack, based on an outermost battery cell on one side of the plurality of battery cells.

8. The battery module of claim 1,
wherein the connection unit is coupled to the front and rear busbar frames through an opening in a guide jig.

9. The battery module of claim 1,
wherein a connection unit fixing part is formed in the connection unit, and the connection unit is attached to the battery cell stack through the connection unit-fixing part.

10. The battery module of claim 9,
wherein the connection unit-fixing part is located at lower parts on both sides of the connection unit, so that the connection unit is attached to the battery cell stack.

11. A battery pack comprising the battery module according to claim 1.

12. The battery module of claim 1, wherein the battery module does not include a protective member between an upper surface of any portion of the battery cell stack and the upper frame.

* * * * *